Aug. 1, 1944.　　　K. C. CLARK　　　2,354,943

DOUBLE TRACK AUXILIARY WHEEL AND TIRE CARRIER

Filed Dec. 8, 1941

INVENTOR.
KENNETH C. CLARK
BY Munn, Liddy, Slaccum & Kane
ATTORNEYS

Patented Aug. 1, 1944

2,354,943

UNITED STATES PATENT OFFICE 2,354,943

DOUBLE TRACK AUXILIARY WHEEL AND TIRE CARRIER

Kenneth C. Clark, Watsonville, Calif.

Application December 8, 1941, Serial No. 422,073

6 Claims. (Cl. 224—29)

The present invention relates to improvements in a double track auxiliary wheel and tire carrier, and it consists of the combinations, constructions and arrangements hereinafter described and claimed.

An object of my invention is to provide a double track auxiliary wheel and tire carrier which differs in construction from my copending application on an Auxiliary wheel and tire carrier, Serial No. 416,507, filed October 25, 1941. In the copending case I disclose an arm pivotally mounted under a vehicle and swingable in a horizontal plane. An auxiliary wheel and tire carrying platform is carried by the free end of the arm and is tiltable on the arm for permitting the auxiliary wheel to be inclined until its tire is rested on the ground, whereupon the wheel can be released from the platform and manually rolled to the desired place for mounting on an axle.

In the present invention a track and carriage take the place of the arm and platform and the track extends under the vehicle for permitting the carriage to move thereunder and carry the auxiliary wheel and tire therewith. The carriage rides on top of the track and the auxiliary wheel is placed between the carriage and vehicle body. The outer end of the track is curved downwardly and the carriage when moved around the curved end will be tilted and will swing the auxiliary wheel into a position where the tire will rest on the ground. The wheel can now be removed from the carriage and rolled along the ground to its destination. Certain types of truck and trailer wheels and tires weigh about two hundred and seventy-five pounds and with the track and carriage arrangement, very little actual lifting of the tire is necessary to move the carriage onto the horizontal portion of the track.

After the tire and carriage are moved onto the horizontal track portion, the carriage may be readily moved until the auxiliary wheel and tire are positioned under the vehicle body. I provide means for locking the carriage against accidental movement and this means clamps the carriage to the track to prevent rattling of the carriage on the track.

In another copending application on a single track auxiliary wheel and tire carrier, Serial No. 428,168, filed Jan. 26, 1942, I disclose a single track with a carriage movable therealong, the track being curved and twisted for guiding the carriage along the side of the vehicle when it is desired to remove a wheel from the carriage, the track also causing the carriage to twist for bringing the plane of the wheel and tire into substantially a vertical position and for bringing the tire into contact with the road so as to support the weight of the auxiliary wheel and tire.

A further object of my invention is to provide a device of the type described which is simple in construction and durable and efficient for the purpose intended.

Other objects and advantages will appear in the following specification, and the novel features of the device will be particularly pointed out in the appended claims.

My invention is illustrated in the accompanying drawing forming a part of this application, in which.

While I have shown only the preferred form of my invention, it should be understood that various changes or modifications may be made within the scope of the appended claims without departing from the spirit of the invention.

Figure 1:
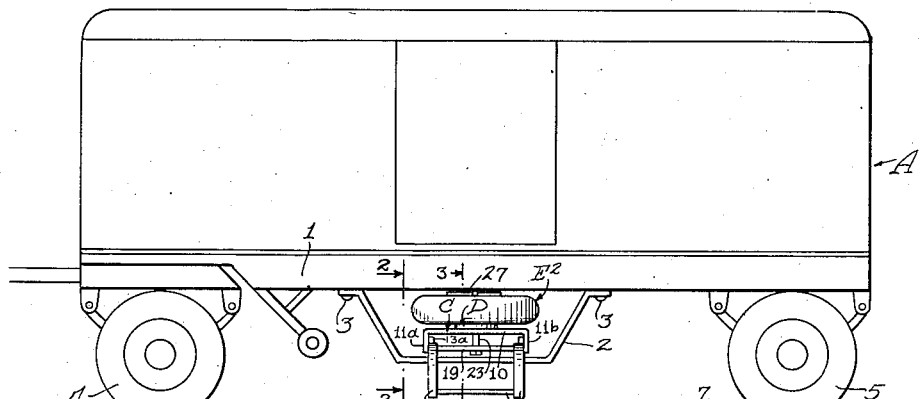
Figure 1 is a side elevation of a vehicle with my double track auxiliary wheel and tire carrier applied thereto.
Figure 2:
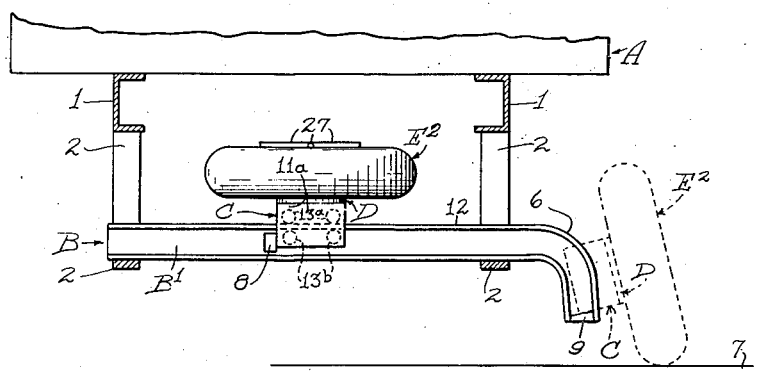
Figure 2 is a transverse section taken along the line 2—2 of Figure 1 and is shown on an enlarged scale.

In carrying out my invention, I make use of a vehicle such as a trailer A and apply my device to the trailer chassis. Figures 1 and 2 show the trailer chassis at 1, and it will be noted that brackets 2 are secured to the channels by rivets 3 or any other suitable fastening means. The brackets 2 may be secured to the underside of the vehicle body at any desired place and I have illustrated the brackets as being placed between the front wheels 4 and the rear wheels 5 of the trailer.

The brackets 2 carry a track indicated generally at B. The track is composed of two spaced rails B1 and B2 that are arranged parallel to each other and are supported by the brackets 2. The rails may be of any desired construction such as I-beams, channel members or angle irons. I have shown channels for the rails B1 and B2 and the flanges of the channels face outwardly or the channels of one rail extend away from the channels of the other rail. The rails B1 and B2 may be secured to the brackets 2 in any manner desired such as by spot welding.

Figure 2 illustrates the rails as terminating adjacent to one of the brackets 2 and as extending beyond the other bracket. The extended portions of the two rails are curved downwardly as at 6 and point to the ground 7 for a purpose hereinafter described. It will be noted that the rails B1 and B2 have stops 8 and 9 for limiting the movement of a carriage C presently to be described. The rails extend transversely across the underside of the vehicle body although I do not wish to be confined to any particular position which the rails or track assume with respect to the body.

The carriage C is U-shaped in cross-section and has a base 10 with downwardly extending sides 11a and 11b, see Figure 1. On the inner surface of each side I provide a set of four rollers, and these rollers are arranged in two pairs, one pair contacting with the upper side of the top channel flange, and the other pair contacting with the lower side of the same flange. The pair of rollers that contact with the top of flange 12 on both rails B1 and B2 are designated by 13a, and the pair of rollers that contact with the undersides of the same flanges are designated by 13b. The two sets of rollers 13a and 13b coact to prevent vertical movement of the carriage on the track but permit longitudinal movement of the carriage along the track. The sides 11a and 11b hold the carriage against lateral movement with respect to the track, and the sides cooperate with the two sets of four rollers for holding the carriage in place on the track.

Figure 3:
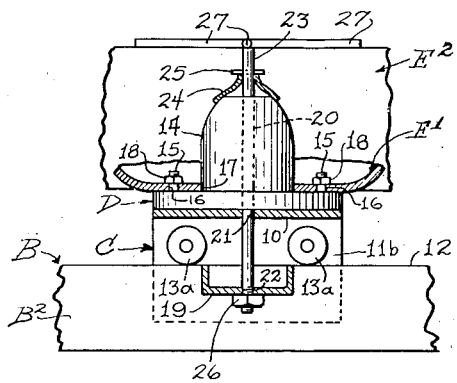
Figure 3 is another transverse section taken along the line 3—3 of Figure 1 and shows a portion of the device on still a larger scale.

The carriage has a platform D mounted thereon, and the platform has a centrally disposed wheel guide 14, and studs 15 project from the platform, see Figure 3. The auxiliary wheel indicated generally at E1 has stud openings 16 for receiving the studs 15. The wheel E1 also has a central opening 17 for receiving the wheel guide 14. With this arrangement it is possible to mount the wheel on the wheel guide after the carriage has been moved into a predetermined inclined position which will be described later, and then to rotate the wheel on the wheel guide until the openings 16 register with the studs 15 whereupon the wheel will drop into place on the platform. Nuts 18 may now be screwed upon the studs 15 for securing the wheel in place. Figure 3 shows the tire E2 as well as a portion of the wheel proper E1.

Before describing how the carriage may be moved along the track for permitting the tire to be removed from the carriage, I will set forth how the carriage may be locked to the track so as to be held against accidental movement. In Figures 1 and 3, I show the two rails B1 and B2 connected to each other by a cross-piece 19. The cross-piece is placed in a position where it will be disposed under the carriage C when the carriage abuts the stop 8. The wheel guide 14 and platform D have a common opening 20 extending therethrough and the opening registers with an opening 21 in the platform C. The cross-piece 19 has an opening 22 that registers with the openings 20 and 21 when the carriage abuts the stop 8.

A locking bolt 23 is passed through the aligned openings 20, 21 and 22 and has a ferrule 24 that bears against the end of the wheel guide 14. A pin 25 rides on the ferrule and it permits the bolt 23 to be rotated with respect to the ferrule. A nut 26 is screwed on to the threaded end of the bolt and the bolt may be tightened by either turning the nut 26 or by turning a bolt handle 27 composed of radially extending arms. It will be seen that as the handle 27 is rotated, the pin 25 and nut 26 are drawn together and this will cause the ferrule 24 to press upon the wheel guide 14 which in turn will move the carirage into clamping relation with the rails B1 and B2 and this will stop any chattering of the device as the vehicle moves over the ground. The bolt 23 therefore performs a double function of holding the carriage against movement along the track and of clamping the carriage down upon the track for preventing any rattling. The handle 27 is small enough to move into the space formed by the tire should this be necessary.

I will now describe how the carriage and wheel may be moved into a position to dispose the tire E2 on the ground 7 and thus permit the wheel to be removed from the carriage. The flange 12 of each rail B1 and B2 is curved downwardly at the point 6 where the rails are curved. The rollers 13a and 13b when striking the curved portion of the flange will cause the carriage to tilt and to move downwardly, the carriage finally coming to rest against the stops 9. When the carriage is in this position it will tilt the wheel as shown by the dotted line illustration in Figure 2 and the wheel tire will rest upon the ground. The nuts 18 may now be removed from the studs and this will permit the wheel to be removed from the wheel guide and be rolled into the desired place. It should be noted that the operator need not lift the wheel during any part of the removal operation.

When placing an auxiliary wheel and tire on the carriage, the carriage is first moved into the dotted line position shown in Figure 2 and then the wheel is aligned with the wheel guide so that the opening 17 in the wheel will receive the guide. The wheel and carriage may now be lifted a very slight distance and then the carriage will start to swing around the curved portions 6 of the rails, and as soon as this takes place the carriage will support the wheel and tire. If the openings 16 do not register with the studs 15, the operator may rotate the wheel so as to align the openings with the studs whereupon the wheel will drop down upon the platform D. The wheel is now secured to the platform by screwing the nuts 18 upon the studs. The operator now moves the carriage together with the wheel along the horizontal portions of the rails until the carriage abuts the stops 8. At this point the locking bolt 23 is passed through the aligned openings 20, 21, and 22 and is secured in place in the manner already set forth. The device is locked against accidental movement until the operator wishes to use the auxiliary wheel and tire. It will be noted from Figure 1 that the free ends of the rails B1 and B2 that carry the stops 9 are braced by a cross-piece 28. This will prevent undue vibration of the rail ends. The bolt 23 clamps the carriage to the rails to prevent any chatter. In this way the device forms a unitary part of the vehicle. The advantage of the device lies in the fact that no lifting of the wheel and tire is required when removing the wheel and tire from the device, and only a slight lifting movement is necessary when moving the auxiliary wheel and tire back under the vehicle.

I claim:

1. In an auxiliary wheel and tire carrier, a pair of parallel rails, a carriage overlying the rails and having sides straddling the rails, rollers carried by the sides and engaging with the rails to permit movement of the carriage along the rails, a platform mounted on the carriage and having studs adapted to be received in stud-receiving openings in the wheel, nuts on the studs for securing the wheel to the platform, a wheel guide on the platform and adapted to enter the axle opening in the wheel, and clamping means extending through the wheel guide, platform and carriage and removably securable to the rails for clamping the wheel and carriage to the rails.

2. An auxiliary wheel and tire carrier for a vehicle comprising a pair of parallel rails extending transversely under the vehicle and having their ends curved downwardly, a carriage movable along the rails and normally supporting a wheel and tire in a horizontal position under the vehicle, clamping means for securing the carriage to the rails for preventing it from moving along the rails and for preventing it from rattling, means securing the wheel and tire to the carriage, said carriage when moved to the curved rail ends swinging the tire into an upright position, the rail ends extending close enough to the ground for permitting the tire to rest on the ground when the carriage is at these ends of the rails, said tire securing means being released for freeing the tire from the carriage.

3. An auxiliary truck or trailer wheel and tire carrier for a truck or trailer and comprising a track extending horizontal under the vehicle and supported thereby, a carriage movable along the track and removably supporting an auxiliary wheel and tire parallel to the track, said track extending to the side of the vehicle and having its ends turned downwardly and positioned close enough to the ground so that when the carriage is moved to the downwardly turned ends of the track, it will swing the auxiliary wheel and tire into a substantially upright position, the tire contacting with the ground and supporting the wheel.

4. An auxiliary wheel and tire carrier for a vehicle comprising a track extending under the vehicle and supported thereby, a carriage movable along the track, means removably securing an auxiliary wheel and tire to the carriage so that it is positioned above the track, said track extending to the side of the vehicle and having its ends turned downwardly and positioned close enough to the ground so that when the carriage is moved to the downwardly turned ends of the track, it will swing the auxiliary wheel and tire into a substantially upright position, the tire contacting the ground and supporting the wheel, said tire securing means being manually releasable when the tire is supported by the ground for freeing the tire from the carriage.

5. In an auxiliary wheel and tire carrier, a pair of generally horizontal parallel rails securable to the underside of a vehicle, a wheel and tire supporting carriage movable along the rails, said rails having downwardly curved ends that are positioned close enough to the ground so that when the carriage and wheel are moved to the rail ends they will be tilted into a substantially upright position, the tire contacting with the ground and supporting the wheel when the carriage is at the end of the rails.

6. An auxiliary wheel and tire carrier for a vehicle comprising a track extending transversely under the vehicle and having its ends curved downwardly, a wheel and tire supporting carriage movable along the track, the downwardly curved ends being positioned close enough to the ground so that when the carriage and wheel are moved to the rail ends, they will be tilted into a substantially upright position, the tire contacting with the ground and supporting the wheel when the carriage is at the curved ends of the rails, stops on the track for limiting the two extreme movements of the carriage, one of the stops positioning the carriage under the vehicle when the carriage contacts with the stop, clamping means for securing the carriage against movement and preventing it from rattling when the carriage is disposed under the vehicle, the other stop cooperating with the track for supporting the carriage in its substantially upright position while the tire and wheel are supported by the ground.

KENNETH C. CLARK.